US009470192B2

(12) United States Patent
Honda

(10) Patent No.: US 9,470,192 B2
(45) Date of Patent: Oct. 18, 2016

(54) FUEL SUPPLIER

(71) Applicant: AISIAN KOGYO KABUSHIKI KAISHA, Obu-shi, Aichi-ken (JP)

(72) Inventor: Yoshihiko Honda, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 238 days.

(21) Appl. No.: 14/132,889

(22) Filed: Dec. 18, 2013

(65) Prior Publication Data

US 2014/0182710 A1    Jul. 3, 2014

(30) Foreign Application Priority Data

Dec. 27, 2012   (JP) ................... 2012-284746

(51) Int. Cl.
| | |
|---|---|
| *F02M 37/10* | (2006.01) |
| *F02M 37/20* | (2006.01) |
| *B60K 15/077* | (2006.01) |
| *F02M 37/02* | (2006.01) |
| *B60K 15/03* | (2006.01) |
| *F17D 1/08* | (2006.01) |

(52) U.S. Cl.
CPC .......... *F02M 37/106* (2013.01); *B60K 15/077* (2013.01); *F02M 37/025* (2013.01); *F02M 37/20* (2013.01); *F17D 1/08* (2013.01); *B60K 2015/03105* (2013.01); *B60K 2015/03111* (2013.01); *B60K 2015/03138* (2013.01); *B60K 2015/0777* (2013.01); *Y10T 137/4824* (2015.04); *Y10T 137/6881* (2015.04); *Y10T 137/86035* (2015.04); *Y10T 137/86043* (2015.04); *Y10T 137/86067* (2015.04); *Y10T 137/86075* (2015.04); *Y10T 137/86155* (2015.04)

(58) Field of Classification Search
CPC .. F02M 37/106; F02M 37/20; F02M 37/025; B60K 15/077; B60K 2015/03138; B60K 2015/03105; B60K 2015/0777; B60K 2015/03111; Y10T 137/86035; Y10T 137/86043; Y10T 137/4824; Y10T 137/86075; Y10T 137/86067; Y10T 137/86155
See application file for complete search history.

(56) References Cited

U.S. PATENT DOCUMENTS

| | | | |
|---|---|---|---|
| 5,511,957 A | 4/1996 | Tuckey et al. | |
| 6,123,511 A * | 9/2000 | Sertier ................ | B60K 15/077 123/509 |

(Continued)

FOREIGN PATENT DOCUMENTS

| | | |
|---|---|---|
| JP | 8-121283 A | 5/1996 |
| JP | 09-020151 A | 1/1997 |

(Continued)

OTHER PUBLICATIONS

JP 09020151 A (Trasnlation).*

(Continued)

*Primary Examiner* — Atif Chaudry
(74) *Attorney, Agent, or Firm* — Conley Rose, P.C.

(57) ABSTRACT

A fuel supplier for an automobile equipped with a fuel tank and an engine has a reservoir, a fuel pump a suction filter and a fuel transfer device. The reservoir is disposed in the fuel tank and is formed in a sealed manner. The fuel pump is configured to supply fuel from the fuel tank to the engine. The suction filter is configured to filter fuel suctioned into the fuel pump. The fuel transfer device is configured to transfer fuel from the fuel tank into the reservoir such that fuel in the reservoir is pressurized due to transfer pressure of the fuel.

9 Claims, 11 Drawing Sheets

(56) References Cited

U.S. PATENT DOCUMENTS

| | | | |
|---|---|---|---|
| 7,827,969 B2 | 11/2010 | Yamamoto et al. | |
| 2005/0155583 A1* | 7/2005 | Mitsudou | F02M 37/103 123/509 |
| 2009/0101117 A1* | 4/2009 | Osawa | F02M 37/106 123/509 |
| 2009/0183715 A1 | 7/2009 | Yamamoto et al. | |

FOREIGN PATENT DOCUMENTS

| | | | |
|---|---|---|---|
| JP | 09020151 A | * | 1/1997 |
| JP | 2006-112398 A | | 4/2006 |
| JP | 2006-233955 A | | 9/2006 |
| JP | 2008-248736 A | | 10/2008 |
| JP | 2009127514 A | | 6/2009 |
| JP | 2010-71098 A | | 4/2010 |

OTHER PUBLICATIONS

Office Action dated Jul. 31, 2014 for Korean Patent Application No. 2013-0112610 (6 pages).

Chinese Patent Application No. 201310664537.3 Office Action dated Sep. 25, 2015 (11 pages).

Japanese Patent Application No. 2012-284746 Notification of Reasons for Refusal dated Feb. 8, 2016 (8 pages).

* cited by examiner

//www.w3.org/1999/xhtml">
FUEL SUPPLIER

CROSS-REFERENCE TO RELATED APPLICATIONS

This application claims priority to Japanese patent application serial number 2012-284746, filed on Dec. 27, 2012, the contents of which are incorporated herein by reference.

STATEMENT REGARDING FEDERALLY SPONSORED RESEARCH OR DEVELOPMENT

Not applicable.

BACKGROUND

This disclosure relates to a fuel supplier configured to supply fuel from a fuel tank to an internal combustion engine (engine) of a vehicle such as automobile.

Japanese Laid-Open Patent Publication No. 2010-71098 discloses a common fuel supplier. The fuel supplier has a fuel pump, a reservoir cup, a reservoir lid, a fuel supply pipe, an electric cable, and a jet pump. The reservoir cup is disposed in the fuel tank and is formed in a container shape having an upper opening to reserve fuel. The reservoir lid is configured to close the upper opening of the reservoir cup. The fuel supply pipe connects the fuel pump to the outside of the fuel tank. The electric cable is connected to the fuel pump. The jet pump is configured to transfer fuel from the fuel tank into a reservoir. The reservoir lid has an opening for receiving the fuel supply pipe and the electric cable. Here, the reservoir includes the reservoir cup and the reservoir lid.

In a known fuel supplier, when the fuel supply pipe and the electric cable are inserted into the opening of the reservoir lid, an opening area between the reservoir lid, the fuel supply pipe and the electric cable is not restricted. Thus, it is not possible to increase the inside pressure of the reservoir. Accordingly, fuel and air are suctioned from the reservoir into a suction filter due to only suction power of the fuel pump, so that negative pressure in the suction filter increases and a load of the fuel pump increases. Thus, there has been a need for improved fuel supplier.

BRIEF SUMMARY OF THE DISCLOSURE

One aspect of this disclosure is a fuel supplier for an automobile equipped with a fuel tank and an engine. This fuel supplier preferably has a reservoir, a fuel pump a suction filter and a fuel transfer device. The reservoir is disposed in the fuel tank and is formed in a sealed manner. The fuel pump is configured to supply fuel from the fuel tank to the engine. The suction filter is configured to filter fuel suctioned into the fuel pump. The fuel transfer device is configured to transfer fuel from the fuel tank into the reservoir such that fuel in the reservoir is pressurized due to the transfer pressure of the fuel.

According to this aspect, because fuel is pressurized in the reservoir due to the transfer pressure of fuel by the fuel transfer device, fuel is pressed into the suction filter from the reservoir. Thus, it is able to reduce negative pressure in the suction filter and to decrease a load on the fuel pump. As a result, it is able to improve the efficiency and the product life of the fuel pump.

DETAILED DESCRIPTION

Each of the additional features and teachings disclosed above and below may be utilized separately or in conjunction with other features and teachings to provide improved fuel suppliers. Representative examples, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the disclosure. Only the claims define the scope of the claimed invention. Therefore, combinations of features and steps disclosed in the following detailed description may not be necessary to practice the claimed invention in the broadest sense, and are instead included merely to particularly describe representative examples. Moreover, various features of the representative examples and the dependent claims may be combined in ways that are not specifically enumerated in order to provide additional useful embodiments of the present teachings.

Figure 1:
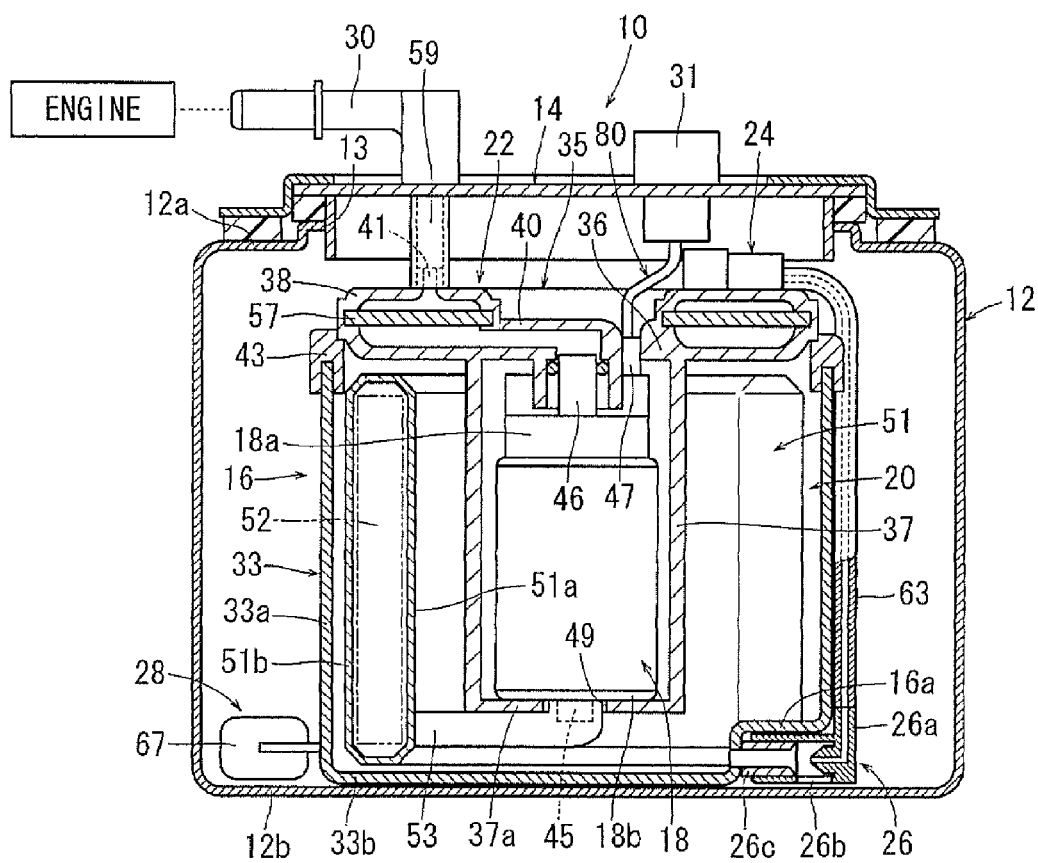
FIG. 1 is a cross-sectional front view of a fuel supplier according to an embodiment.
Figure 2:
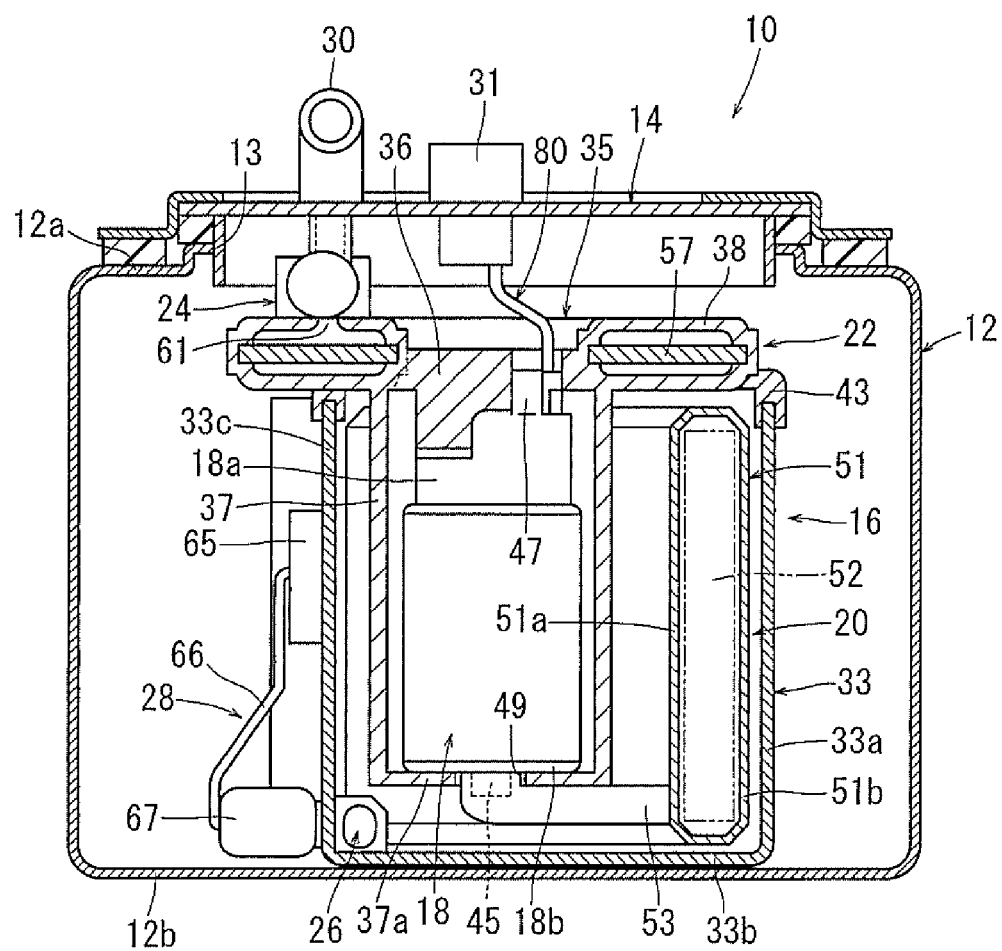
FIG. 2 is a cross-sectional side view of a fuel supplier.
Figure 3:
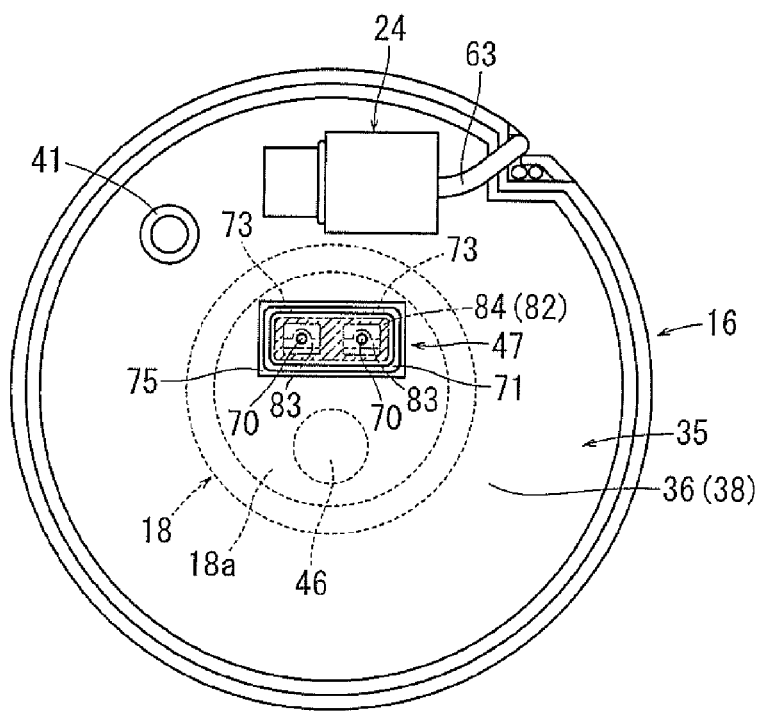
FIG. 3 is a plan view of a reservoir.
Figure 4:
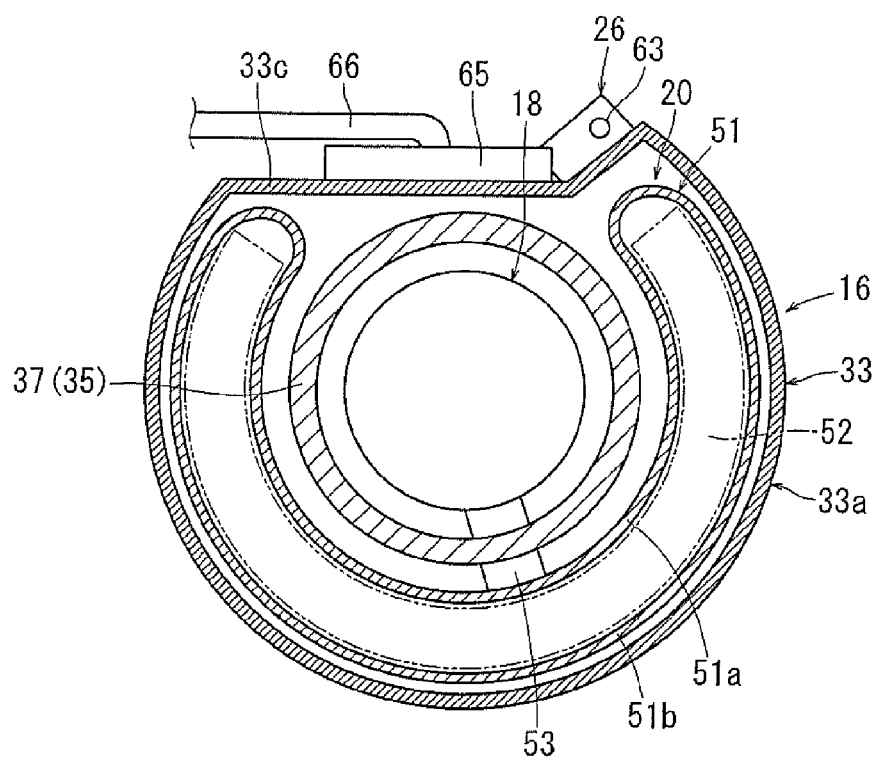
FIG. 4 is a cross-sectional plan view of a reservoir.

FIG. 1 is a cross-sectional front view of an embodiment of a fuel supplier. FIG. 2 is a cross-sectional side view of the fuel supplier. FIG. 3 is a plan view of a reservoir. FIG. 4 is a cross-sectional plan view of the reservoir. As shown in FIG. 1, the fuel supplier 10 is disposed in, e.g., a fuel tank 12 of an automobile in order to pump fuel from the fuel tank 12 to an internal combustion engine (engine). An upper wall 12a of the fuel tank 12 has an opening 13.

The fuel supplier 10 has a set plate 14, a reservoir 16, a fuel pump 18, a suction filter 20, a high pressure filter 22, a pressure regulator 24, a jet pump 26 and a sender gauge 28. The set plate 14 is attached to the upper wall 12a in order to close the opening 13 of the fuel tank 12. The set plate 14 has a fuel discharge pipe 30 and an externally-connected electric connector 31. The fuel discharge pipe 30 is connected to the engine (in detail, injectors) via a fuel supply pipe (not shown). The externally-connected electric connector 31 is connected to an external power source and an electric control unit (ECU) via an external connector (not shown). Here, the set plate 14 corresponds to "lid member" in this disclosure.

The reservoir 16 includes of a reservoir cup 33 and a cover member 35. The reservoir cup 33 is made of resin material and is formed in a hollow cylinder shape having an upper open end and a lower closed end. The cover member 35 is made of resin material and is shaped to close the upper opening of the reservoir cup in a sealed manner. The reservoir 16 houses the fuel pump 18 and the suction filter 20 therein. The reservoir 16 is put in the fuel tank 12 from the opening 13 and is disposed on a bottom wall 12b of the fuel tank 12. A bottom wall 33b of the reservoir 16 contacts the bottom wall 12b of the fuel tank 12 in a plane contact manner.

The cover member 35 has a cover portion 36, a pump case portion 37 and a filter case portion 38. The cover portion is formed in a disk shape. The pump case portion 37 downwardly extends from a center of the cover portion 36 and is formed in a hollow cylinder shape having a bottom. The filter case portion 38 is disposed around an outer circumference of the cover portion 36 and is formed in a flattened hollow circular shape. The filter case portion 38 partially constitutes the cover portion 36. Here, the cover member 35 corresponds to "cover member" in this disclosure. The cover portion 36 corresponds to "cover portion" in this disclosure. The pump case portion 37 corresponds to "pump case" in this disclosure. The filter case portion 38 corresponds to "filter case" in this disclosure.

A fuel inlet 40 for the entering of fuel is formed at an inner circumference of the filter case portion 38. A fuel outlet 41 for the discharging of fuel is formed at an upper surface of the filter case portion 38. Here, the cover member 35 can be composed of the cover portion 36 (including the filter case portion 38) and the pump case portion 37 that are integrated with each other by snap-fit or welding, etc. The cover member 35 can be composed of the cover portion 36 (including the filter case portion 38) and the filter case portion 38 that are integrated with each other by snap-fit or welding, etc. The cover portion 36 and the filter case portion 38 can be integrated with each other by snap-fit or welding, etc.

The cover member 35 is attached to the reservoir cup 33 in order to close the upper opening of the reservoir cup 33. The upper opening of the reservoir cup 33 is mainly blocked with the cover portion 36 (including the filter case portion 38). A sealing member 43 is attached to an upper end of a side wall 33a of the reservoir cup 33. The sealing member 43 engages the side wall 33a of the reservoir cup 33 with the cover portion 36 (including the filter case portion 38) of the cover member 35 in a sealed manner. Here, the cover portion 36 (including the filter case portion 38) of the cover member 35 can be fitted into the reservoir cup 33 or may contact a side wall 33a of the reservoir cup 33 in a sealed manner due to the weight of the cover member 35 and the fuel pump 18, etc. In such a situation, the sealing member 43 can be omitted.

The fuel pump 18 is a motor-integrated pump where an electric motor portion and an impeller pump portion are arranged in a vertical direction. When the motor portion drives in order to rotate the impeller, the pump portion suctions fuel and then pressurizes and discharges the fuel. A fuel inlet 45 protruding downwards is formed at a lower end portion 18b of the fuel pump 18. A fuel outlet 46 protruding upwards and an electric connector 47 are provided at an upper end portion 18a of the fuel pump 18. The fuel pump 18 is housed in the pump case portion 37 of the cover member 35 in an upright manner. The fuel inlet 45 is fitted into a fitting hole 49 formed in a bottom plate 37a of the pump case portion 37.

As shown in FIG. 4, the suction filter 20 has a filter member 51, a frame 52 and a connection pipe 53. The filter member 51 is formed in a C-shaped hollow cylinder shape as seen from a top view. The filter member 51 is formed in a sac-like shape having a filter portion 51a on an inner circumferential side and a filter portion 51b on an outer circumferential side. The frame 52 is disposed between the filter portion 51a and the filter portion 51b in order to keep a distance therebetween. The connection pipe 53 is connected to lower end portions of the filter portion 51a and the frame 52 and extends in a radial direction of the filter member 51 (refer to FIGS. 1 and 2). The connection pipe 53 communicates with an inner space of the filter portion 51a.

The suction filter 20 is disposed in the reservoir cup 33 of the reservoir 16 such that the suction filter 20 surrounds the pump case portion 37 below the filter case portion 38 of the cover member 35. There is a predetermined distance between the side wall 33a of the reservoir cup 33 and the filter portion 51b of the filter member 51. Also, there is a predetermined distance between the filter portion 51a of the filter member 51 and the pump case portion 37. An end of the connection pipe 53 is connected to the fuel inlet 45 of the fuel pump 18 (refer to FIGS. 1 and 2). The filter member 51 can entirely or nearly entirely surround the pump case portion 37. The filter member 51 can have a bottom completely or partially closing a lower opening of the filter member 51.

A flat wall section 33c is formed as a part of the side wall 33a of the reservoir cup 16 such that the wall section 33c does not face the filter member 51 of the suction filter 20 (refer to FIG. 2). The side wall 33a of the reservoir cup 33a, which includes the flat wall section 33c, is formed in a D-shape as seen from a top view (refer to FIG. 4). The flat wall section 33c is disposed near the pump case portion 37.

Figure 5:
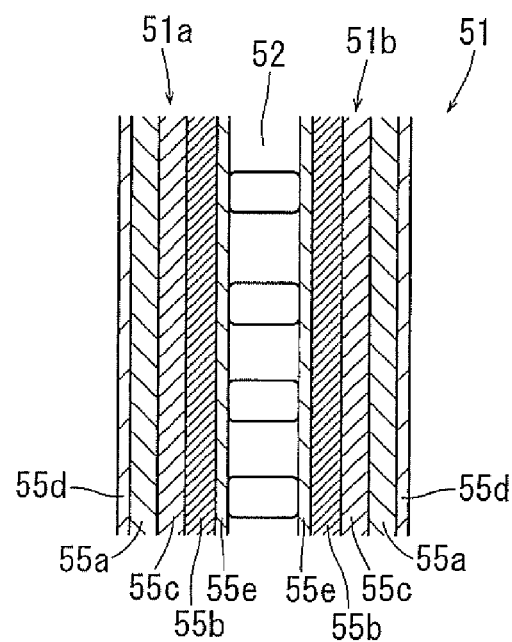
FIG. 5 is a partial cross-sectional view of a filter member of a suction filter.

The filter member 51 will be described in detail. FIG. 5 is a partial cross-sectional view showing the filter member of the suction filter. As shown in FIG. 5, the filter member 51 is composed of a plurality of layers (5 layers in this embodiment). That is, a filter layer 55a composed of a coarse non-woven cloth is disposed on an upstream side (outer layer side), a filter layer 55b composed of a fine non-woven cloth is disposed on a downstream side (inner layer side), and a filter layer 55c composed of a middle non-woven cloth is disposed between the filter layer 55a and the filter layer 55b. In addition, a cover layer 55d composed of a mesh fabric is disposed on an upstream side of the filter layer 55a. The cover layer 55d has apertures larger than those of the filter layer 55a and prevents fraying of the non-woven cloth of the filter layer 55a. A cover layer 55e composed of a non-woven cloth is disposed on a downstream side of the filter layer 55b. The cover layer 55e mainly prevents fraying of the non-woven cloth of the filter layer 55b. Here, the cover layer 55e is composed of the non-woven cloth, so that it can have a filtering function. The filter layers 55a-55c of the filter member 51 are formed such that particle size capable of passing therethrough becomes smaller from the upstream side toward the downstream side. Thus, it is able to filter fuel in stages, so that it is able to increase actual filtering area. Here, each of the filter layers 55a-55c corresponds to a "filter layer" in this disclosure. The non-woven cloth of the filter layers can be replaced with a filter paper, fibrous compact material or the like. The material of the cover layers 55d and 55e can be changed as appropriate. The number of the layers of the filter member 51 can be modified as appropriate.

As shown in FIG. 1, a ring plate-shaped filter member 57 is horizontally disposed in the filter case portion 38 of the cover member 35 in order to configure the high pressure filter 22. The filter case portion 38 is formed by disposing the filter member 57 between an upper half and a lower half and welding the halves. The fuel inlet 40 of the filter case portion 38 that communicates with an inner space of the lower half is connected to the fuel outlet 46 of the fuel pump 18. The fuel outlet 41 of the filter case portion 38 that communicates with an inner space of the upper half is connected to the fuel discharge pipe 30 of the set plate 14 via a connection pipe 59.

The filter member 57 is made of the same materials as the filter member 51 (refer to FIG. 5) of the suction filter 20. An upstream side cover layer 55d of the filter member 57 (refer to FIG. 5) is directed downward, and a downstream side cover layer 55e (refer to FIG. 5) is directed upward. For example, the filter member 51 of the suction filter 20 and the filter member 57 of the high pressure filter 22 are configured to capture more than 90% of foreign material larger than 40 μm and is captured by a strainer of an injector. The filter member 51 of the suction filter 20 is configured to capture foreign materials that are equal to or smaller than foreign material that the filter member 57 of the high pressure filter 22 can capture. Thus, it is able to prevent clogging of the filter member 57 having a smaller filtering area than the filter member 51. Here, the filter member 57 of the high pressure filter 22 can be configured to capture foreign materials that are equal to or smaller than foreign material that the filter member 51 of the suction filter 20 can capture. The materials of the filter member 51 can be different from those of the filter member 57. The number of layers of the filter member 57 can be modified appropriately.

The filter member 51 of the suction filter 20 is formed in a substantially hollow cylinder shape. The filter case portion 38 of the high pressure filter 22 is formed in a flatten shape. The high pressure filter 22 is disposed above the suction filter 20. In this way, an increase in the height of the reservoir 16 can be prevented while an increase in the filtering area of the filter member 51 of the suction filter 20 can be allowed.

The pressure regulator 24 is disposed on the filter case portion 38 of the cover member 35. A fuel inlet (not shown) of the pressure regulator 24 is connected to a connector 61 (refer to FIG. 2) that is formed at an upper wall of the filter case portion 38 and communicates with the inner space of the upper half. The pressure regulator 24 controls pressure in the filter case portion 38 and discharges excess fuel.

The jet pump 26 is disposed in a concave portion 16a formed at a lower surface of the bottom portion of the reservoir 16. A driving fuel inlet 26a of the jet pump 26 and the pressure regulator (in detail, the outlet for excess fuel (not shown)) are connected to each other via a return pipe 63. A transfer fuel inlet 26b of the jet pump 26 opens at the fuel tank 12 (outside of the reservoir 16). A fuel outlet 26c of the jet pump 26 is connected to the inside of the reservoir cup 33 of the reservoir 16. The jet pump 26 utilizes excess fuel discharged from the pressure regulator 24 as driving fuel in order to pump fuel from the fuel tank 12 (outside of the reservoir 16) into the reservoir 16. Thus, the reservoir 16 is filled with fuel. Fuel supplied to the engine by the fuel pump 18 and fuel flowing into the fuel tank 12 correspond to fuel flowing out of the reservoir 16. Here, the jet pump 26 corresponds to a "fuel transfer device", a "first fuel transfer device" and and/or a "first jet pump".

As shown in FIG. 2, the sender gauge 28 has a gauge body 65, an arm 66 and a float 67. The gauge body 65 is attached to an outer surface of the flat wall section 33c of the side wall 33a of the reservoir cup 33 of the reservoir 16. The arm 66 is connected to the gauge body 65 pivotally in a vertical direction. The float 67 is attached to an end of the arm 66 such that the float 67 can float at a level in the fuel tank 12. The sender gauge 28 is a liquid level gauge for detecting the remaining fuel in the fuel tank 12, i.e., the liquid level determined by the electric resistance and outputs signals to the ECU. Here, cables (not shown) for the sender gauge 28 are connected to the externally-connected electric connector 31 of the set plate 14.

Figure 6:
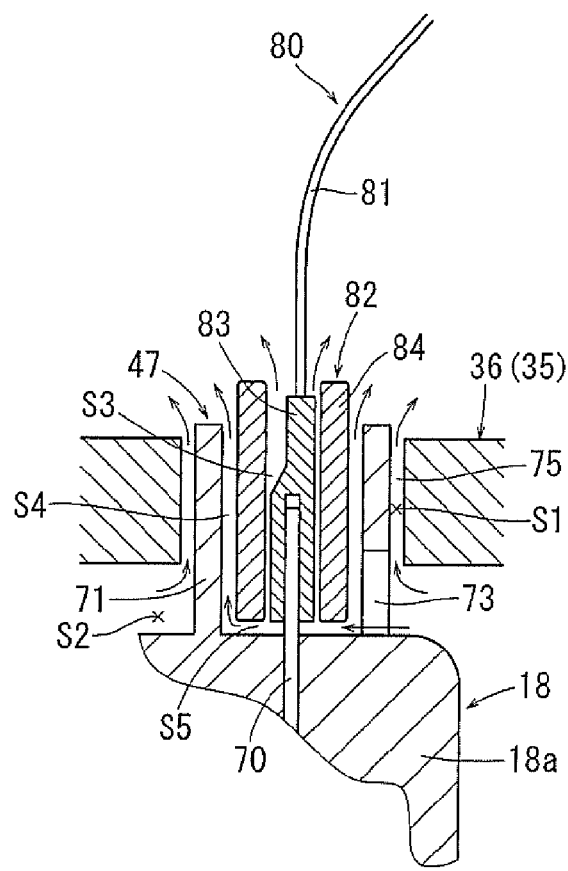
FIG. 6 is a cross-sectional view showing a neighboring region of an electric connector of a fuel pump.

A neighboring region of the electric connector 47 of the fuel pump 18 will be described. FIG. 6 is a cross-sectional view showing the neighboring region of the electric connector of the fuel pump. As shown in FIG. 6, the electric connector 47 of the fuel pump 18 has two male terminals 70 and a connector housing 71 (refer to FIG. 3). The male terminals 70 protrude upward from the upper end portion 18a of the fuel pump 18. The connector housing 71 is formed in a hollow rectangular prism shape such that it is disposed on the upper end portion 18a and surrounds the male terminals 70. A base portion of the connector housing 71 has a communication hole 73. A lower end of the communication hole 73 is in the same plane with the upper surface of the upper end portion 18a.

A rectangular-shaped connector receiving hole 75 is formed at a center area of the cover portion 36 of the cover member 35. The connector housing 71 is inserted into the connector receiving hole 75 such that there is a predetermined space S1 between the cover portion 36 and the connector housing 71. There is a predetermined space S2 between the cover portion 36 and the upper end portion 18a. The spaces S1 and S2 form a first flow path (S1, S2) for the flowing of fuel and air from the reservoir 16. The electric connector 47 of the fuel pump 18 corresponds to "communication member" in this disclosure. The connector receiving hole 75 corresponds to "communication hole" in this disclosure.

As shown in FIG. 2, the externally-connected electric connector 31 of the set plate 14 and the electric connector 47 of the fuel pump 18 are connected to each other via a harness 80. The harness 80 has two electric wires 81 (one of them is shown in FIG. 6) and pairs of coupling connectors 82 attached to both ends of the electric wires (one of them is shown in FIG. 6). One of the coupling connectors 82 is fitted into the electric connector 47 in order to connect them each other. The other (not shown) of the coupling connectors 82 is connected to the externally-connected electric connector 31 of the set plate 14 by fitting.

As shown in FIG. 6, the one of the coupling connectors 82 has a female terminal 83 and a connector housing 84. The female terminal 83 is connected to the electric wire 81. The connector housing 84 is formed in a hollow rectangular prism shape at the end of the electric wire 81 such that it surrounds the female terminal 83. There is a predetermined space S3 between the female terminal 83 and the connector housing 84. The female terminal 83 is connected to the male terminal 70 of the electric connector 47 by fitting. The connector housing 84 is fitted into the connector housing 71 such that there is a predetermined space S4. There is a predetermined space S5 between the connector housing 84 and the upper end portion 18a of the fuel pump 18. The connector housing 84 has a pair of hollow portions arranged in a horizontal direction. The female terminals 83 are disposed in the hollow portions, respectively, by attachment (refer to FIG. 3).

When the coupling connector 82 of the harness 80 is connected to the electric connector 47 of the fuel pump 18, the space S2, the communication hole 73 of the connector housing 71 of the electric connector 47, the space S3 and the space S5 form a second flow path (S2, 73, S3, S5) for the flowing of fuel and the air from the reservoir 16 and exposing terminals 83 and the 87 of the connectors 47 and 82 to the fuel. The base portion of the male terminal 70 is exposed at the space S5. The male terminal 70 and the female terminal 83 are exposed at spaces S5 and S3, respectively, such that fuel does not accumulate around the terminals. The space S2, the communication hole 73 of the connector housing 71 of the electric connector 47, and the space S4 form a third flow path (S2, 73, S4) for the flowing of fuel and air from the reservoir 16.

The fuel can flow from the reservoir 16 into the fuel tank 12 via the first flow path (S1, S2), the second flow path (S2, 73, S3, S5) and the third flow path (S2, 73, S4) (refer to arrows in FIG. 6). Here, the first flow path, the second flow path and the third flow path form a "fuel flow opening" in this disclosure. An opening area of the fuel flow opening, that is, total of an opening area of the first flow path (S1, S2), an opening area of the second flow path (S2, 73, S3, S5) and an opening area of the third flow path (S2, 73, S4) is configured such that the amount of fuel flowing from the reservoir 16 is less than the amount of fuel transferred by the jet pump 26 (including the amount of excess fuel (driving fuel)) from the pressure regulator 24. The first flow path, the second flow path and the third flow path can have a function as a breathing hole such that they allow air to flow from the reservoir 16. Further, when the liquid level in the reservoir 16 decreases, such that they allow air to flow from the outside of the reservoir 16 into the reservoir 16.

Behavior of the fuel supplier 10 will be described. When the fuel pump 18 is driven, fuel from the reservoir 16 is filtered by the filter member 51 of the suction filter 20 and then is suctioned into the fuel pump 18 via the connection pipe 53. The fuel is pressurized by the fuel pump 18 and is discharged from the fuel outlet 46 to the high pressure filter 22. The fuel is filtered by the filter member 57 of the high pressure filter 22 and then its pressure is adjusted by the pressure regulator 24 in accordance with the driving condition of the engine. The adjusted fuel is supplied to the engine via the connection pipe 59, the fuel discharge pipe 30 of the set plate 14 and a fuel supply pipe (not shown).

Excess fuel discharged from the pressure regulator 24 is returned to the reservoir 16 via the jet pump 26. The jet pump 26 transfers, i.e., pumps fuel from the fuel tank 12 (outside the reservoir 16) into the reservoir 16. The amount of the fuel flowing from the reservoir 16 via the first flow path, the second flow path and the third flow path is less than the amount of the fuel transferred by the jet pump 26 (including the amount of driving fuel). Thus, the fuel is pressurized in the reservoir 16.

According to the fuel supplier 10, because the fuel is pressurized in the reservoir 16 due to fuel transfer pressure by the jet pump 26, the fuel in the reservoir 16 is pressed into the suction filter 20. Thus, it is able to decrease negative pressure in the suction filter 20 and to reduce the load on the fuel pump 18. As a result, it is able to improve efficiency and product life of the fuel pump 18. Even if the filter member 51 of the suction filter 20 is partially clogged, it is able to suppress a decrease in pressure in the filter member 51.

The amount of the fuel flowing from the reservoir 16 is less than the amount of fuel transferred by the jet pump 26 (including the amount of driving fuel) so that the fuel in the reservoir 16 may be easily pressurized.

The jet pump 26 can be used as a fuel transfer means. Because the jet pump 26 does not have any mechanical moving elements, its configuration can be simplified.

The first flow path (S1, S2) for the flowing of fuel and air from the reservoir 16 can be defined by the connector receiving hole 75 and the electric connector 47. The connector receiving hole 75 of the cover member 35 closes the upper opening of the reservoir cup 33 of the reservoir 16. The electric connector 47 of the fuel pump 18 is inserted into the connector receiving hole 75.

Fuel and air are able to flow from the reservoir 16 via the second flow path (S2, 73, S3, S5) and the third flow path (S2, 73, S4) that are formed at the electric connector 47 and the coupling connector 82. That is, it is able to circulate fuel through the second flow path (S2, 73, S3, S5) and the third flow path (S2, 73, S4). Because the terminals 70, 83 of the connectors 47, 82 are exposed to fuel flowing through the second flow path (S2, 73, S3, S5), fuel hardly accumulates around the terminals 70, 83. Thus, the generation of deteriorated fuel caused by the accumulation of fuel can be prevented. Further, galvanic corrosion of the terminals 70, 83 can be prevented.

The cover member 35 of the reservoir 16, a pump case (the pump case portion 37) housing the fuel pump 18 and a filter case (the filter case portion 38) of the high pressure filter 22 can be integrated as one unit in order to decrease the number of members and the number of man-hours required for assembly.

Figure 7:
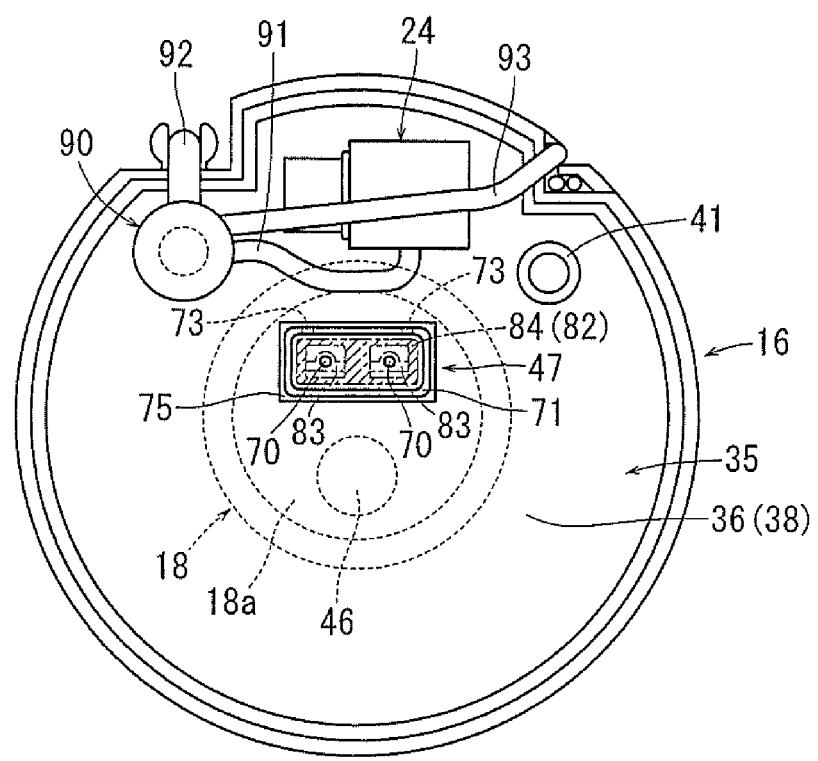
FIG. 7 is a cross-sectional plan view of a reservoir according to an embodiment.

Another embodiment will now be described. Because this embodiment and following embodiments are similar to the embodiment shown in FIG. 1 with the exception of certain modifications, the modifications will be described while the same (or common) elements will not be described. FIG. 7 is a cross-sectional plan view of the reservoir. In this embodiment, the fuel supplier 10 (refer to FIGS. 1 and 2) is applied to a saddle-shaped fuel tank having a main tank portion and a sub-tank portion (e.g., refer to Laid-Open Patent Publication No. 2010-71098). The reservoir 16 is disposed in the main tank portion. Here, the jet pump 26 is referred to as a "first jet pump 26".

As shown in FIG. 7, a second jet pump 90 is disposed on the cover member 35 of the reservoir 16. The second jet pump 90 is configured to be same as the first jet pump 26. A driving fuel inlet (not shown) of the second jet pump 90 is connected to an excess fuel outlet (not shown) of the pressure regulator 24 via a first return pipe 91. A fuel outlet of the second jet pump 90 is connected to the driving fuel inlet 26a of the first jet pump 26 (refer to FIG. 1) via a second return pipe 93. A transfer fuel inlet (not shown) of the second jet pump 90 is connected to the inside of a bottom section of the sub-tank portion (not shown) via a transfer pipe 92. Because the second jet pump 90 is disposed on the cover member 35 of the reservoir 16, the position of the fuel outlet 41 is altered.

The second jet pump 90 utilizes excess fuel discharged from the pressure regulator 24 as driving fuel in order to pump fuel from the sub-tank portion through the transfer pipe 92. The first jet pump 26 utilizes excess fuel from the pressure regulator 24 and fuel pumped from the sub-tank portion as driving fuel for pumping fuel from the main tank portion of the fuel tank 12 into the reservoir 16. Here, the second jet pump 90 corresponds to a "jet pump" and/or a "second fuel transfer device" in this disclosure.

Figure 8:
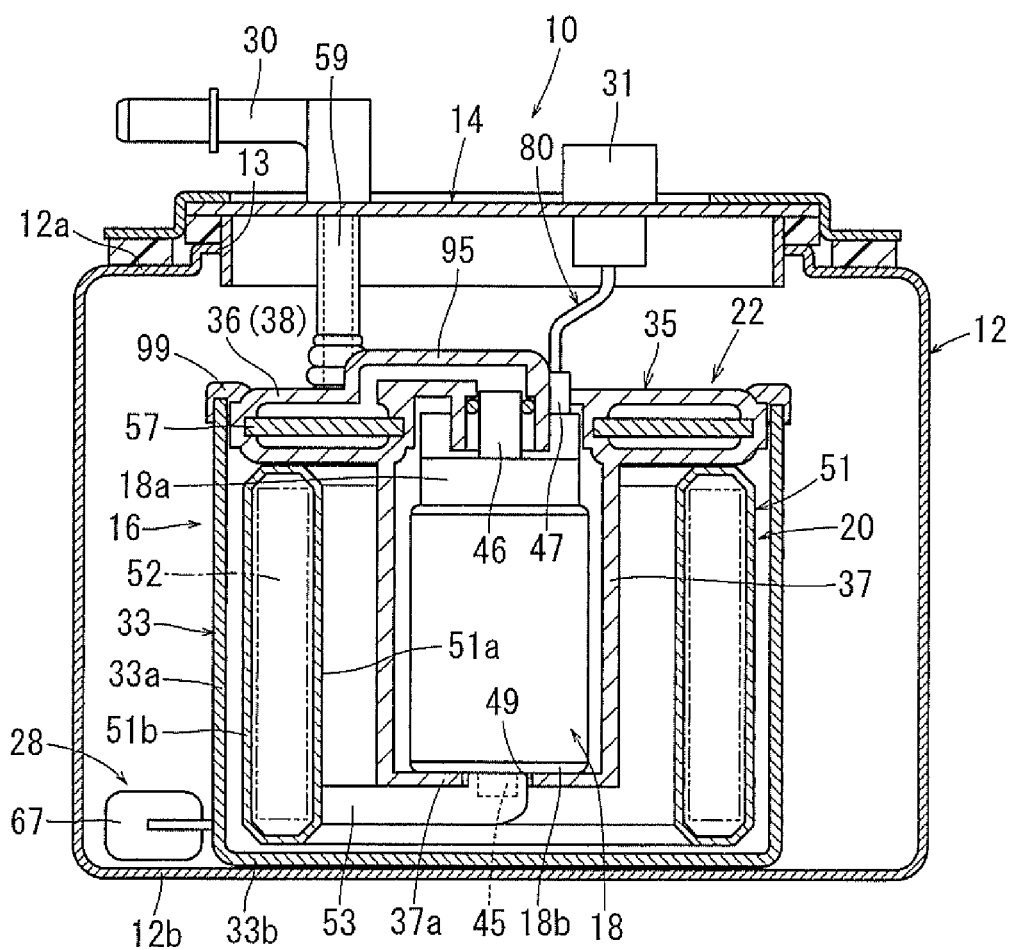
FIG. 8 is a cross-sectional front view of a fuel supplier according to an embodiment.
Figure 9:
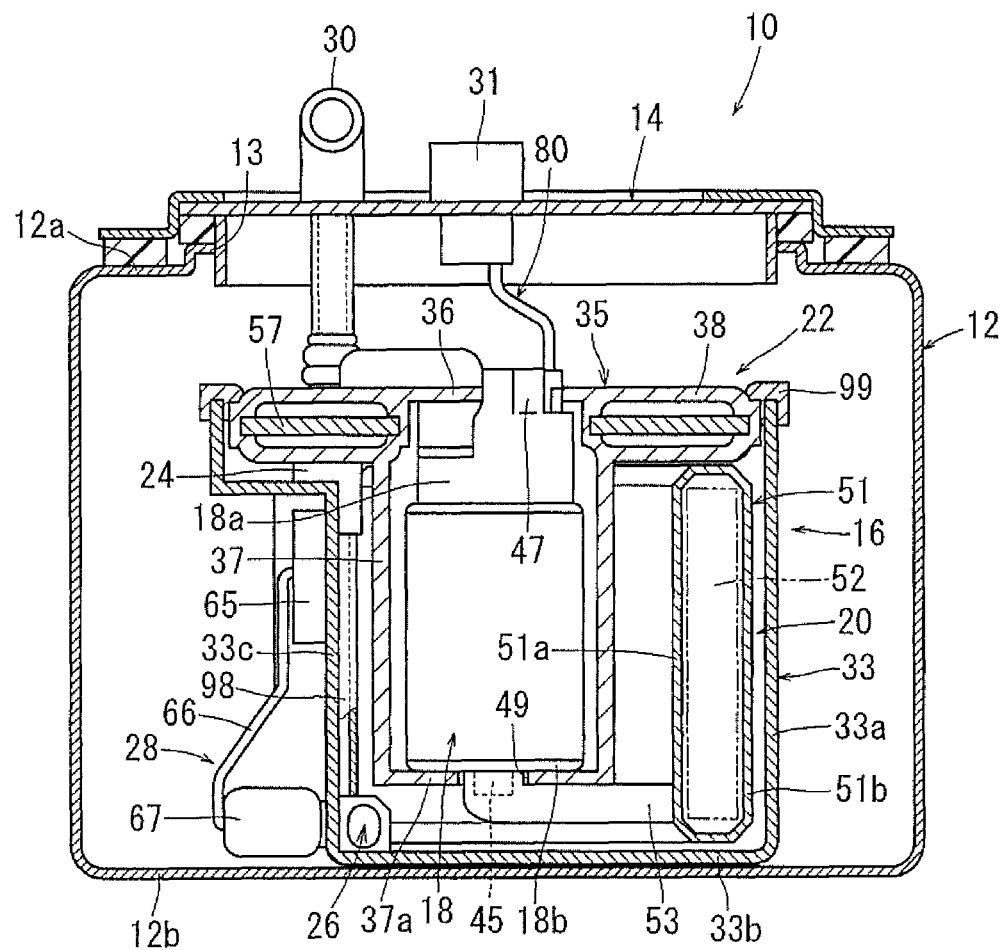
FIG. 9 is a cross-sectional side view of a fuel supplier.
Figure 10:
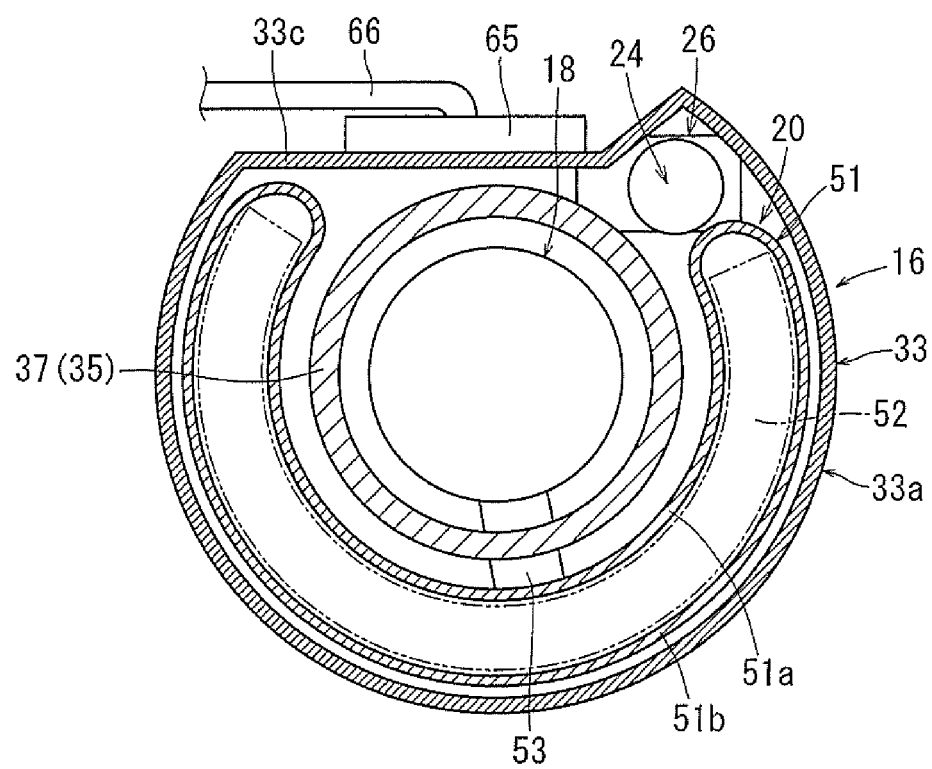
FIG. 10 is a cross-sectional plan view of a reservoir.

Another embodiment will now be described. FIG. 8 is a cross-sectional front view of a fuel supplier. FIG. 9 is a cross-sectional side view of a fuel supplier. FIG. 10 is a cross-sectional plan view of a reservoir. As shown in FIG. 8, this embodiment corresponds to the embodiment shown in FIG. 1 in which the filter member 57 of the high pressure filter 22 is turned upside down. A fuel inlet 95 communicating with an inner space of an upper half is formed at an upper end of an inner circumference of the filter case portion 38 of the cover member 35. The fuel inlet 95 is connected to the fuel outlet 46 of the fuel pump 18. A fuel outlet (not shown) of the filter case portion 38 is formed to communicate with an inner space of the lower half.

As shown in FIG. 9, the pressure regulator 24 is disposed below the filter case portion 38 of the cover member 35. The jet pump 26 is located in a bottom section of the reservoir 16 and is nearly directly under the pressure regulator 24 (refer to FIG. 10). The driving fuel inlet of the jet pump 26 and the excess fuel outlet of the pressure regulator 24 are connected to each other via a return pipe 98 formed in a straight shape. The transfer fuel inlet of the jet pump 26 opens at the fuel tank 12 via the reservoir cup 33 of the reservoir 16.

As shown in FIGS. 8 and 9, the reservoir cup 33 of the reservoir 16 is formed such that the whole of the cover member 35 is housed in the reservoir cup 33. An upper end of the side wall 33a of the reservoir cup 33 is formed in a hollow cylinder shape in order to house the cover member 35 therein. A sealing member 99 is attached to the upper end of the side wall 33a in order to connect the reservoir cup 33 with the cover portion 36 (including the filter case portion 38) of the cover member 35 in a sealed manner.

Figure 11:
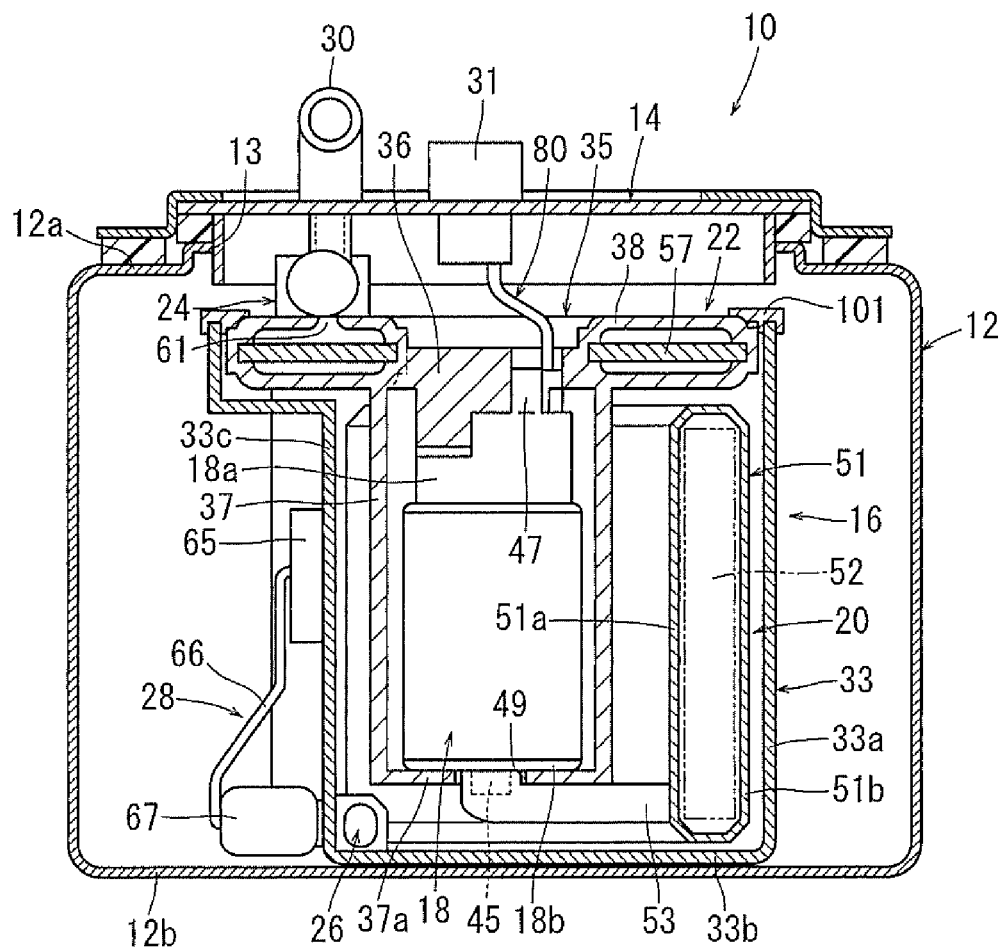
FIG. 11 is a cross-sectional side view of a fuel supplier according to an embodiment.

Another embodiment will now be described. FIG. 11 is a cross-sectional side view of a fuel supplier. As shown in FIG. 11, this embodiment corresponds to the embodiment shown in FIG. 1 in which the reservoir cup 33 of the reservoir 16 is formed such that the whole of the cover member 35 is housed in the reservoir cup 33. The upper end of the side wall 33a of the reservoir cup 33 that houses the cover member 35 therein is formed in a hollow cylinder shape. A sealing member 101 is attached to the upper end of the reservoir cup 33 in order to connect the reservoir cup 33 with an outer circumference of an upper section of the cover portion 36 (including the filter case portion 38) of the cover member 35 in a sealed manner.

Figure 12:
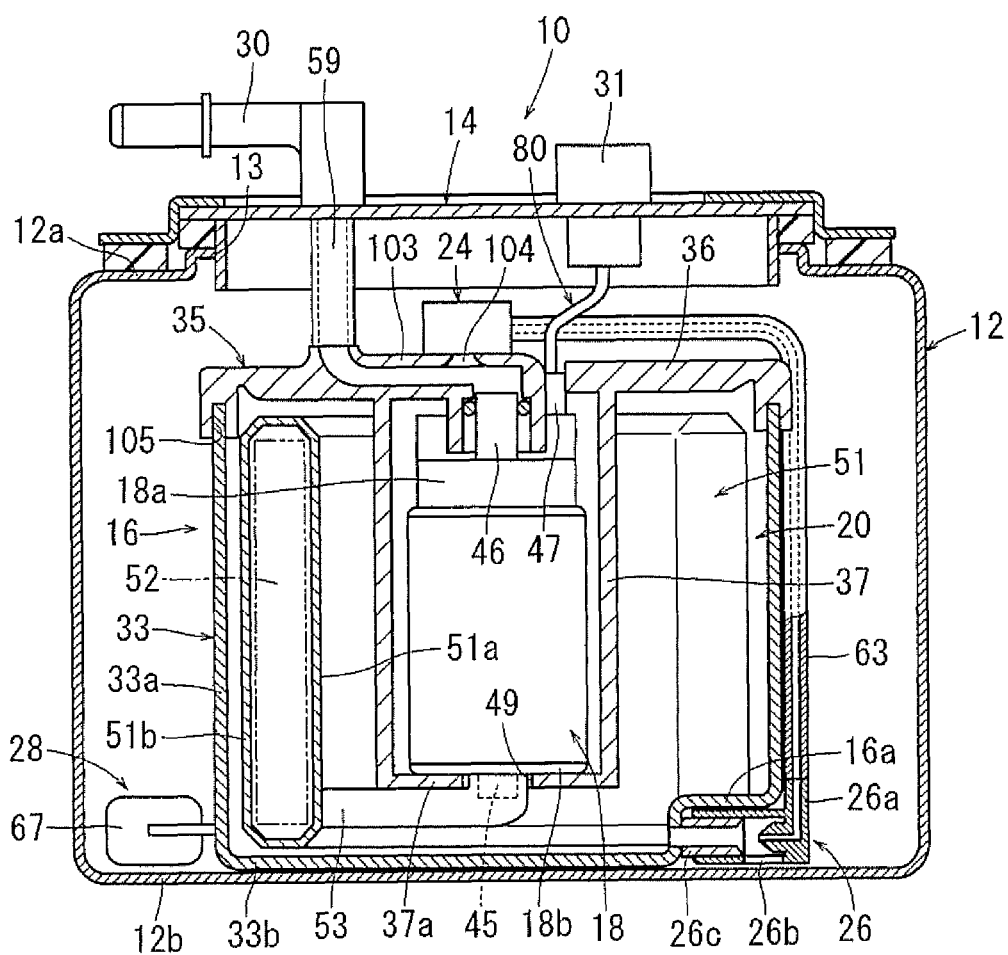
FIG. 12 is a cross-sectional front view of a fuel supplier according to an embodiment.

Another embodiment will now be described. FIG. 12 is a cross-sectional front view of a fuel supplier. As shown in FIG. 12, this embodiment corresponds to the embodiment shown in FIG. 1 in which the high pressure filter 22 (the filter case portion 38 and the filter member 57) is omitted from the cover member 35. Thus, the cover member 35 serves the role as the cover member 35 and a pump case (the pump case portion 37). The cover portion 36 of the cover member 35 has a communication path 103 for connecting the fuel outlet 46 of the fuel pump 18 to the connection pipe 59. A fuel inlet (not shown) of the pressure regulator 24 is connected to a connection port 104 that is formed at an upper wall of the communication path 103 and communicates with the communication path 103. A ring-shaped groove 105 is formed at a lower surface of a circumferential section of the cover portion 36 of the cover member 35 such that the upper end of the side wall 33a of the reservoir cup 33 is fitted into the groove 105. Accordingly, the sealing member 43 is omitted.

Figure 13:
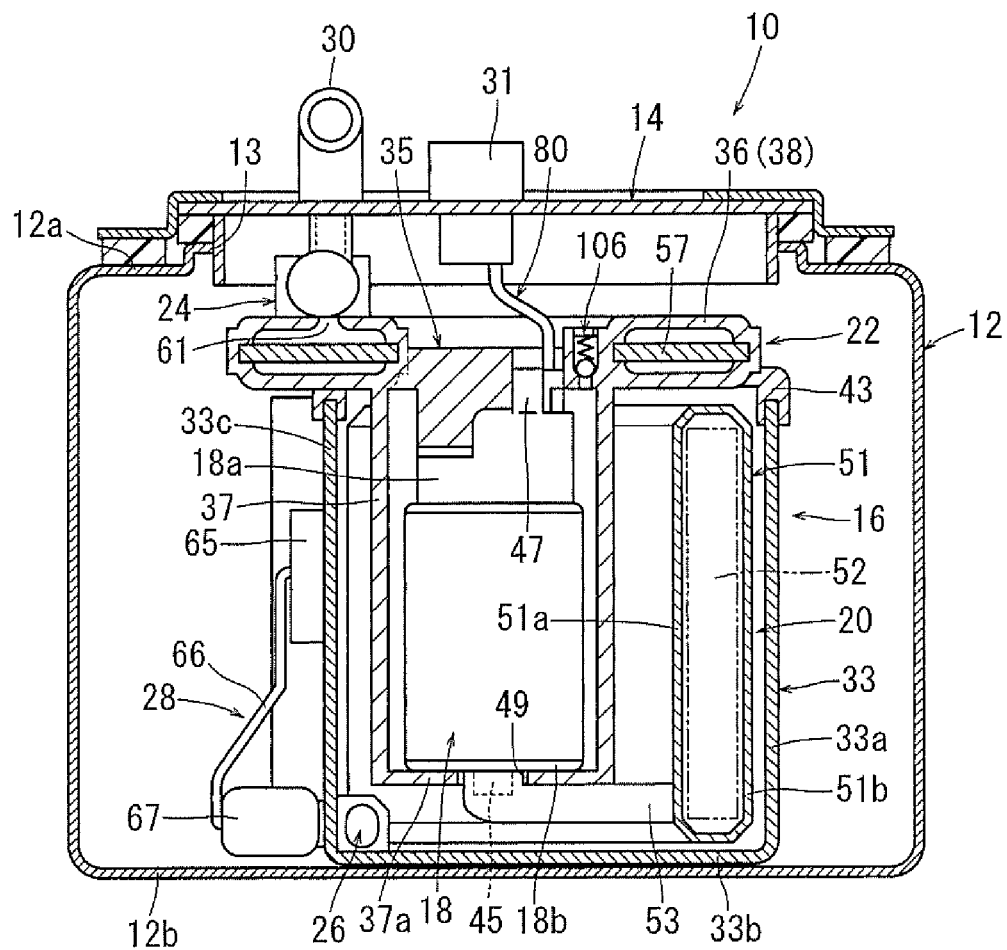
FIG. 13 is a cross-sectional side view of a fuel supplier according to an embodiment.

Another embodiment will now be described. FIG. 13 is a cross-sectional side view of the fuel supplier. As shown in FIG. 13, this embodiment corresponds to the embodiment shown in FIG. 1 in which the cover portion 36 (including the filter case portion 38) of the cover member 35 has a relief valve 106 for keeping inner pressure of the reservoir 16 at a predetermined value. The relief valve 106 is located in the cover portion 36 of the cover member 35 such that the relief valve 106 is between the filter case portion 38 and the connector receiving hole 75 (refer to FIG. 3). The relief valve 106 is configured to close in a normal state and to open in order to discharge fuel and air from the reservoir 16 to the outside in a condition where the inner pressure of the reservoir 16 is higher than the predetermined value. Thus, because the relief valve 106 keeps the inner pressure of the reservoir 16 at the predetermined value, it is able to prevent excessive pressure of the inner pressure of the reservoir 16.

This disclosure is not limited to the above-described embodiments and can be modified without departing from the scope of the invention. For example, a pump other than the jet pump 26 can be used as fuel transfer device. Although the jet pump 26 uses excess fuel discharged from the pressure regulator 24 as driving fuel, the jet pump 26 can utilize fuel discharged from a vapor jet of the fuel pump 18 as driving fuel and can utilize a part of fuel discharged from the fuel pump 18 as driving fuel. Pipes and wires other than the electric connector 47 of the fuel pump 18 can be used as communication element inserted into the communication opening. The cover member 35 can have a dedicated flow path for the flowing of fuel and air from the reservoir 16. In this case, the first flow path (S1, S2) and/or the second flow path (S2, 73, S3, S5) can be omitted.

The invention claimed is:

1. A fuel supplier for an automobile having a fuel tank and an engine, comprising:
    a reservoir disposed in the fuel tank and formed in a sealed manner;
    a fuel pump configured to suction fuel from the reservoir and supply the fuel to the engine;
    a suction filter for filtering fuel suctioned into the fuel pump;
    a fuel transfer device configured to transfer fuel from the fuel tank to the reservoir such that fuel in the reservoir is pressurized relative to a pressure of the fuel tank, due to transfer pressure of the fuel; and
    a communication element for providing a connection between an inside of the reservoir and an outside of the reservoir;
    wherein the reservoir has a reservoir cup formed in a cup shape and having an upper open end and a closing member configured to close the upper open end of the reservoir cup;
    wherein the closing member defines a communication hole for receiving the communication element; and
    wherein the communication element is inserted within the communication hole such that the closing member and the communication element define therebetween a first flow path for and air flowing from the reservoir.

2. The fuel supplier according to claim 1, wherein an amount of fuel flowing from the reservoir is less than the amount of fuel transferred by the fuel transfer device.

3. The fuel supplier according to claim 2, wherein the fuel transfer device is a jet pump configured to utilize the flow of fuel that is discharged from the fuel pump and is not supplied to the engine for transferring fuel.

4. The fuel supplier according to claim 1, wherein the communication element is an electric connector of the fuel pump housed in the reservoir.

5. The fuel supplier according to claim 4, further comprising:
    a coupling connector connected to the electric connector and having a first terminal,
    wherein the electric connector has a second terminal; and
    the electric connector and the coupling connector define a second flow path for flowing fuel and air from the reservoir and exposing the second terminal of the electric connector and the first terminal of the coupling connector to the fuel.

6. The fuel supplier according to claim 1, wherein the closing member of the reservoir has a relief valve for keeping inner pressure of the reservoir at a predetermined value.

7. The fuel supplier according to claim 1, wherein the closing member of the reservoir is configured to house the fuel pump therein.

8. The fuel supplier according to claim 1, further comprising:
   a high pressure filter for filtering fuel discharged from the fuel pump;
   wherein the closing member of the reservoir is configured to house the high pressure filter therein.

9. The fuel supplier according to claim 1, wherein the fuel transfer device is configured to generate the transfer pressure.

* * * * *